US010670493B2

United States Patent
Morishita et al.

(10) Patent No.: US 10,670,493 B2
(45) Date of Patent: Jun. 2, 2020

(54) SAFETY DIAGNOSIS SYSTEM FOR STRUCTURE

(71) Applicant: Kabushiki Kaisha TOPCON, Tokyo-to (JP)

(72) Inventors: Tadayuki Morishita, Tokyo (JP); Yoshihito Saito, Tokyo (JP); Hiroaki Ryujin, Tokyo (JP); Koichiro Fuse, Tokyo-to (JP); Kazuhiro Ogawa, Tokyo-to (JP); Kaoru Kumagai, Tokyo-to (JP); Ritsuo Sakimura, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 396 days.

(21) Appl. No.: 14/861,489

(22) Filed: Sep. 22, 2015

(65) Prior Publication Data

US 2016/0084961 A1 Mar. 24, 2016

(30) Foreign Application Priority Data

Sep. 24, 2014 (JP) ................................. 2014-193607

(51) Int. Cl.
*G01M 5/00* (2006.01)
(52) U.S. Cl.
CPC ................................. *G01M 5/0066* (2013.01)
(58) Field of Classification Search
CPC ............ G01M 5/0033; G01M 5/0066; G01M 5/0091; G01V 1/008; G01V 1/16;
(Continued)

(56) References Cited

U.S. PATENT DOCUMENTS 5,663,501 A 9/1997 Nakamura et al.
6,681,180 B2 * 1/2004 Bevly ..................... B60T 8/172
280/5.5
(Continued)

FOREIGN PATENT DOCUMENTS

JP 9-105665 A 4/1997
JP 2000-214267 A 8/2000
(Continued)

OTHER PUBLICATIONS

Fang et al., "Determination of earthquake magnitude using GPS displacement waveforms from real-time precise point positioning," Geophys. J. Int. (Advanced publication: Oct. 17, 2013) pp. 196, 461-472.*

(Continued)

*Primary Examiner* — Bernarr E Gregory
*Assistant Examiner* — Fred H Mull
(74) *Attorney, Agent, or Firm* — Nields, Lemack & Frame, LLC

(57) ABSTRACT

The invention provides a safety diagnosis system for structure, which comprises one GNSS receiver installed on an upper floor of a structure, a control device having a storage unit for storing a program which prepares an absolute displacement curve of the structure based on an absolute coordinate measured by the GNSS receiver and a displacement of the absolute coordinate, calculates a maximum inter-layer displacement and a maximum inter-layer deformation angle per each floor based on the absolute displacement curve and prepares an inter-layer deformation angle curve and a judging unit for performing a diagnosis of the safety of the structure based on the maximum inter-layer displacement and the maximum inter-layer deformation angle, and a display unit, wherein the control device calculates the maximum inter-layer displacement and the maxi- (Continued)

mum inter-layer deformation angle per each floor and the inter-layer deformation angle curve based on a displacement of the absolute coordinate and the program and makes the display unit display a diagnosis result of the structure as evaluated by the judging unit based on at least one of the maximum inter-layer displacement and the maximum inter-layer deformation angle or the inter-layer deformation angle curve.

28 Claims, 8 Drawing Sheets

(58) Field of Classification Search
CPC ... G01V 1/68; G01V 1/18; G01V 1/28; G01V 1/20; G01V 1/189; G01V 1/003; G01V 1/005; G01S 19/14; G01S 19/07; G01S 19/24; G01S 19/13; G01S 19/17; G01S 19/35; G01S 2205/00; G01S 2205/006; G01S 7/003; G01S 7/418; G01S 7/42; G01S 13/00; G01S 13/42; G01S 13/66; G01S 13/74; G01S 13/86; G01S 13/767; G01S 13/865; G01S 13/867; G01S 17/74; G01S 17/87; G01S 2013/9367; G06K 7/10366; H04B 10/502; F41J 2/00; F41J 2/02; B64C 39/024; B64C 2201/12; F41G 3/26
See application file for complete search history.

(56) References Cited

U.S. PATENT DOCUMENTS

| | | | | |
|---|---|---|---|---|
| 7,342,538 | B2* | 3/2008 | Zimmerman | G01S 5/009 342/357.27 |
| 8,640,544 | B2* | 2/2014 | Lee | G01M 7/00 73/579 |
| 2005/0165588 | A1* | 7/2005 | Iwan | G01M 7/00 703/2 |
| 2009/0259405 | A1* | 10/2009 | Spears | G01V 1/008 702/14 |
| 2012/0310607 | A1* | 12/2012 | Liu | G01V 1/003 703/1 |
| 2013/0090858 | A1 | 4/2013 | Crespi et al. | |
| 2015/0355050 | A1* | 12/2015 | Yoshida | G01M 5/0033 702/56 |
| 2017/0068004 | A1* | 3/2017 | Takanashi | G01V 1/001 |

FOREIGN PATENT DOCUMENTS

| | | |
|---|---|---|
| JP | 2002-168963 A | 6/2002 |
| JP | 2003-344550 A | 12/2003 |
| JP | 3952851 B2 | 8/2007 |
| JP | 2007-276889 A | 10/2007 |
| JP | 2013-160709 A | 8/2013 |
| JP | 2014-134413 A | 7/2014 |
| JP | 2014-134436 A | 7/2014 |
| KR | 10-1331343 B1 | 11/2013 |

OTHER PUBLICATIONS

European communication dated Feb. 17, 2016 in corresponding European patent application No. 15186222.4.
Celebi, "Seismic Monitoring of Structures and New Developments", Earthquakes and Health Monitoring of Civil Structures, Oct. 28, 2012.
Hokmabadi, et al., "Recording inter-storey drifts of structures in time-history approach for seismic design of building frames", Australian Journal of Structural Engineering, vol. 13, No. 2, Jan. 1, 2012.
Akira Mita, "Structural Dynamics for Health Monitoring", Sankeisha Co. Ltd., pp. 1-128, Mar. 2003.

* cited by examiner

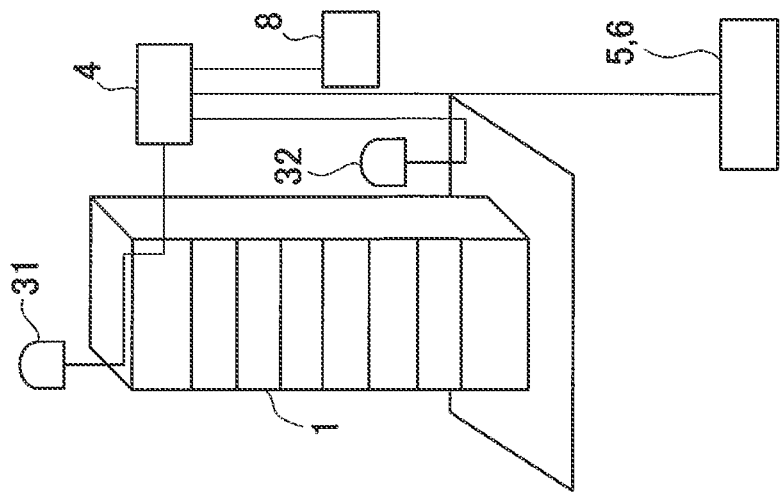
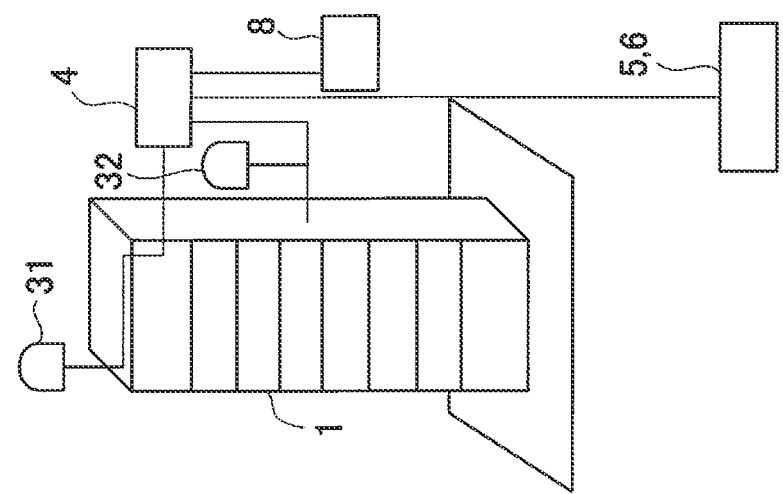
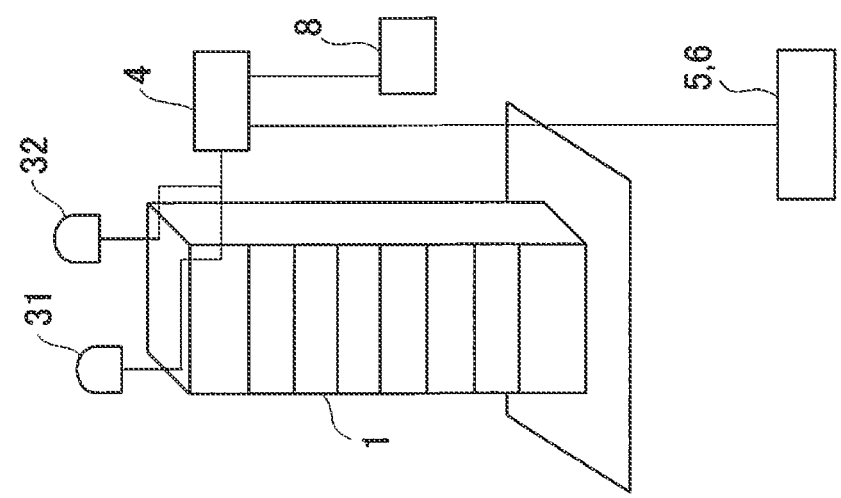

SAFETY DIAGNOSIS SYSTEM FOR STRUCTURE

BACKGROUND OF THE INVENTION

The present invention relates to a safety diagnosis system for a structure for diagnosing safety of a structure by directly measuring a displacement of the structure.

Conventionally, when safety of a structure is diagnosed, acceleration sensors are installed at two points or more including at least a foundation part and an upper floor of the structure, for example, and the safety of the structure is diagnosed based on an acceleration data measured by the acceleration sensor. When an earthquake occurs, an acceleration record is obtained from the acceleration sensor and an absolute displacement is obtained by second-order integration of the acceleration record. A vibration mode form of a building assumed from the absolute displacement is applied, an absolute acceleration and a relative displacement of each floor of the building are calculated, and a performance curve of the building is obtained by taking the absolute acceleration as an axis of ordinate and the relative displacement as an axis of abscissa. Further, a requirement curve of the building is theoretically acquired based on an input seismic motion as observed, and a residual aseismic performance of the building is determined from a comparison between the performance curve and the requirement curve. Or a maximum value of values obtained by dividing a difference of the absolute displacement between continuous upper and lower floors by a floor height, that is, a maximum inter-layer deformation angle of each floor is calculated. From the calculated maximum inter-layer deformation angle of the structure, the safety of the structure or a necessity of restoration of the structure is diagnosed.

However, in a case where an acceleration sensor is used, since a displacement amount of the structure cannot be directly collected as measurement data, it is necessary to obtain the displacement amount by applying the second-order integration to an acceleration data as acquired. Therefore, the displacement amount of the structure needs to be acquired by calculation and consequently there is a problem that errors are accumulated and an accuracy is deteriorated. Further, as a purpose of avoiding a drift, a case where a high-pass filter passage processing is used at the same time is general. Therefore, measurements requiring a long time such as measurement of a difference between a position before an earthquake and a position after the earthquake of the structure, for example, and an evaluation of an aftereffect variation and a residual deformation of the structure gradually developing after the occurrence of the earthquake based on the measurement are impossible in principle.

Japanese Patent Laid-Open Publication No. 2000-214267 relates to an earthquake observation system, where a plurality of seismometers installed on arbitrary floors aboveground and underground are connected to a personal computer via a LAN. When a vibration occurs in a building due to an earthquake or the like, it is configured such that the vibration is detected by each seismometer and held in a server in each seismometer and the detection of vibration is transmitted from the server to the personal computer. A configuration in which, an earthquake observation record held in the server of each seismometer can be inspected by operating the personal computer and accessing each seismometer, is disclosed.

Further, Japanese Patent No. 3952851 discloses a technique of evaluating a residual aseismic performance of a building from a comparison between a performance curve and a requirement curve of the building.

Further, "Vibration response estimating method of building structure using only one acceleration sensor", Architectural Institute of Japan Technical Reports, Vol. 19, No. 42, pp. 461 to 464, June 2013 relates to a vibration response estimating method of a building structure using only one acceleration sensor, where one acceleration sensor is installed on the top floor of a building, and absolute accelerations of all floors of the building is acquired based on an acceleration from the acceleration sensor. A configuration in which an absolute displacement is calculated by integrating an absolute acceleration, and a maximum inter-layer deformation angle per each floor is estimated from the absolute displacement as calculated, is disclosed.

SUMMARY OF THE INVENTION

It is an object of the present invention is to provide a safety diagnosis system for structure which diagnose safety of a structure based on a displacement of the structure measured by a GNSS (Global Navigation Satellite System) receiver.

To attain the object as described above, a safety diagnosis system for structure according to the present invention comprises one GNSS receiver installed on an upper floor of a structure, a control device having a storage unit for storing a program which prepares an absolute displacement curve of the structure based on an absolute coordinate measured by the GNSS receiver and a displacement of the absolute coordinate, calculates a maximum inter-layer displacement and a maximum inter-layer deformation angle per each floor based on the absolute displacement curve and prepares an inter-layer deformation angle curve and a judging unit for performing a diagnosis of the safety of the structure based on the maximum inter-layer displacement and the maximum inter-layer deformation angle, and a display unit, wherein the control device calculates the maximum inter-layer displacement and the maximum inter-layer deformation angle per each floor and the inter-layer deformation angle curve based on a displacement of the absolute coordinate and the program and makes the display unit display a diagnosis result of the structure as evaluated by the judging unit based on at least one of the maximum inter-layer displacement and the maximum inter-layer deformation angle or the inter-layer deformation angle curve.

Further, in the safety diagnosis system for structure according to the present invention, a diagnosis result screen is displayed on the display unit, the diagnosis result screen comprises an evaluation result graph display area, a safe region and a dangerous region are separated and displayed on the evaluation result graph display area, and shows in what range from the safe region to the dangerous region the inter-layer deformation angle curve exists.

Further, in the safety diagnosis system for structure according to the present invention, the diagnosis result screen further comprises a numerical value display area for displaying the maximum inter-layer displacement and the maximum inter-layer deformation angle per each floor of the structure.

Further, in the safety diagnosis system for structure according to the present invention, the diagnosis result screen further comprises an evaluation result display area for displaying a diagnosis result by the judging unit in letters and a comprehensive evaluation display area displaying the diagnosis result in color.

Further, in the safety diagnosis system for structure according to the present invention, after the diagnosis of the structure is performed by the judging unit, and further, after a predetermined time has elapsed, the GNSS receiver measures an absolute coordinate of an installation position of the GNSS receiver, the control device calculates a displacement of the installation position over time from a reference absolute coordinate and the absolute coordinate of the installation position after the predetermined time has elapsed, and the judging unit diagnoses safety of the structure based on the displacement over time.

Further, in the safety diagnosis system for structure according to the present invention, at least one GNSS receiver is further installed at a predetermined position of the structure, and the control device calculates a deformation condition of the structure based on measurement results of each of the GNSS receivers.

Further, in the safety diagnosis system for structure according to the present invention, the GNSS receiver comprises one GNSS receiving unit installed at a measuring position and for receiving a signal from a satellite, and an arithmetic processing device configured so as to obtain a receiving signal outputted from the GNSS receiving unit at a predetermined time interval, to obtain the receiving signal from the GNSS receiving unit at two adjacent times, to calculate a time difference of Doppler fluctuation from the two receiving signals, to obtain a deviation of the measuring position based on a calculation result, to integrate the deviation and to obtain a vibration of the measuring position.

Further, in the safety diagnosis system for structure according to the present invention, the time interval is selected within a range from 10 ms to ½ of the time interval at which a signal issued from the satellite is updated and further set to $1/10$ or less of an estimated vibration cycle of a body to be measured.

Furthermore, in the safety diagnosis system for structure according to the present invention, the displacement of the absolute coordinate is a sum of a total sum of the deviations and an initial value of the absolute coordinate measured by the GNSS receiver.

According to the present invention, the safety diagnosis system for structure comprises one GNSS receiver installed on an upper floor of a structure, a control device having a storage unit for storing a program which prepares an absolute displacement curve of the structure based on an absolute coordinate measured by the GNSS receiver and a displacement of the absolute coordinate, calculates a maximum inter-layer displacement and a maximum inter-layer deformation angle per each floor based on the absolute displacement curve and prepares an inter-layer deformation angle curve and a judging unit for performing a diagnosis of the safety of the structure based on the maximum inter-layer displacement and the maximum inter-layer deformation angle, and a display unit, wherein the control device calculates the maximum inter-layer displacement and the maximum inter-layer deformation angle per each floor and the inter-layer deformation angle curve based on a displacement of the absolute coordinate and the program and makes the display unit display a diagnosis result of the structure as evaluated by the judging unit based on at least one of the maximum inter-layer displacement and the maximum inter-layer deformation angle or the inter-layer deformation angle curve. As a result, a displacement of a rooftop of the structure can be obtained without integration by an actually measured value and the diagnosis of the structure can be performed with high accuracy, and in a case where one GNSS receiver is used, a mechanism for synchronizing the GNSS receivers with each other is not needed, and it becomes possible to simplify the system with the reduction of the cost.

Further, according to the present invention, in the safety diagnosis system for structure, a diagnosis result screen is displayed on the display unit, the diagnosis result screen comprises an evaluation result graph display area, a safe region and a dangerous region are separated and displayed on the evaluation result graph display area, and shows in what range from the safe region to the dangerous region the inter-layer deformation angle curve exists. As a result, a condition of the structure can be grasped immediately.

Further, according to the present invention, in the safety diagnosis system for structure, the diagnosis result screen further comprises a numerical value display area for displaying the maximum inter-layer displacement and the maximum inter-layer deformation angle per each floor of the structure. As a result, detailed numerical values of the maximum inter-layer displacement and the maximum inter-layer deformation angle per each floor can be confirmed.

Further, according to the present invention, in the safety diagnosis system for structure, the diagnosis result screen further comprises an evaluation result display area for displaying a diagnosis result by the judging unit in letters and a comprehensive evaluation display area displaying the diagnosis result in color. As a result, the condition of the structure can be grasped immediately and a subsequent method of handling and the like can be grasped easily.

Further, according to the present invention, in the safety diagnosis system for structure, after the diagnosis of the structure is performed by the judging unit, and further, after a predetermined time has elapsed, the GNSS receiver measures an absolute coordinate of an installation position of the GNSS receiver, the control device calculates a displacement of the installation position over time from a reference absolute coordinate and the absolute coordinate of the installation position after the predetermined time has elapsed, and the judging unit diagnoses safety of the structure based on the displacement over time. As a result, a diagnosis of the structure including the aftereffect variation and a residual displacement of the structure can be performed, and an accuracy of safety diagnosis of the structure can be improved.

Further, according to the present invention, in the safety diagnosis system for structure, at least one GNSS receiver is further installed at a predetermined position of the structure, and the control device calculates a deformation condition of the structure based on measurement results of each of the GNSS receivers. As a result, deformation states such as a twist of the structure, a mode of vibration, the displacement amount of the structure itself, and the like, can be obtained.

Furthermore, according to the present invention, in the safety diagnosis system for structure, the GNSS receiver comprises one GNSS receiving unit installed at a measuring position and for receiving a signal from a satellite, and an arithmetic processing device configured so as to obtain a receiving signal outputted from the GNSS receiving unit at a predetermined time interval, to obtain the receiving signal from the GNSS receiving unit at two adjacent times, to calculate a time difference of Doppler fluctuation from the two receiving signals, to obtain a deviation of the measuring position based on a calculation result, to integrate the deviation and to obtain a vibration of the measuring position. As a result, a safety diagnosis of the structure can be performed with high accuracy and moreover, without error factors.

BRIEF DESCRIPTION OF THE DRAWINGS

FIG. 7A to FIG. 7C are schematical block diagrams of the safety diagnosis system for structure showing an application example of the present embodiment.

DETAILED DESCRIPTION OF THE PREFERRED EMBODIMENT

Description will be given below on embodiments of the present invention by referring to the attached drawings.

First, referring to FIG. 1 and FIG. 2, description will be given on general features of a safety diagnosis system for structure according to an embodiment of the present invention.

Figure 1:
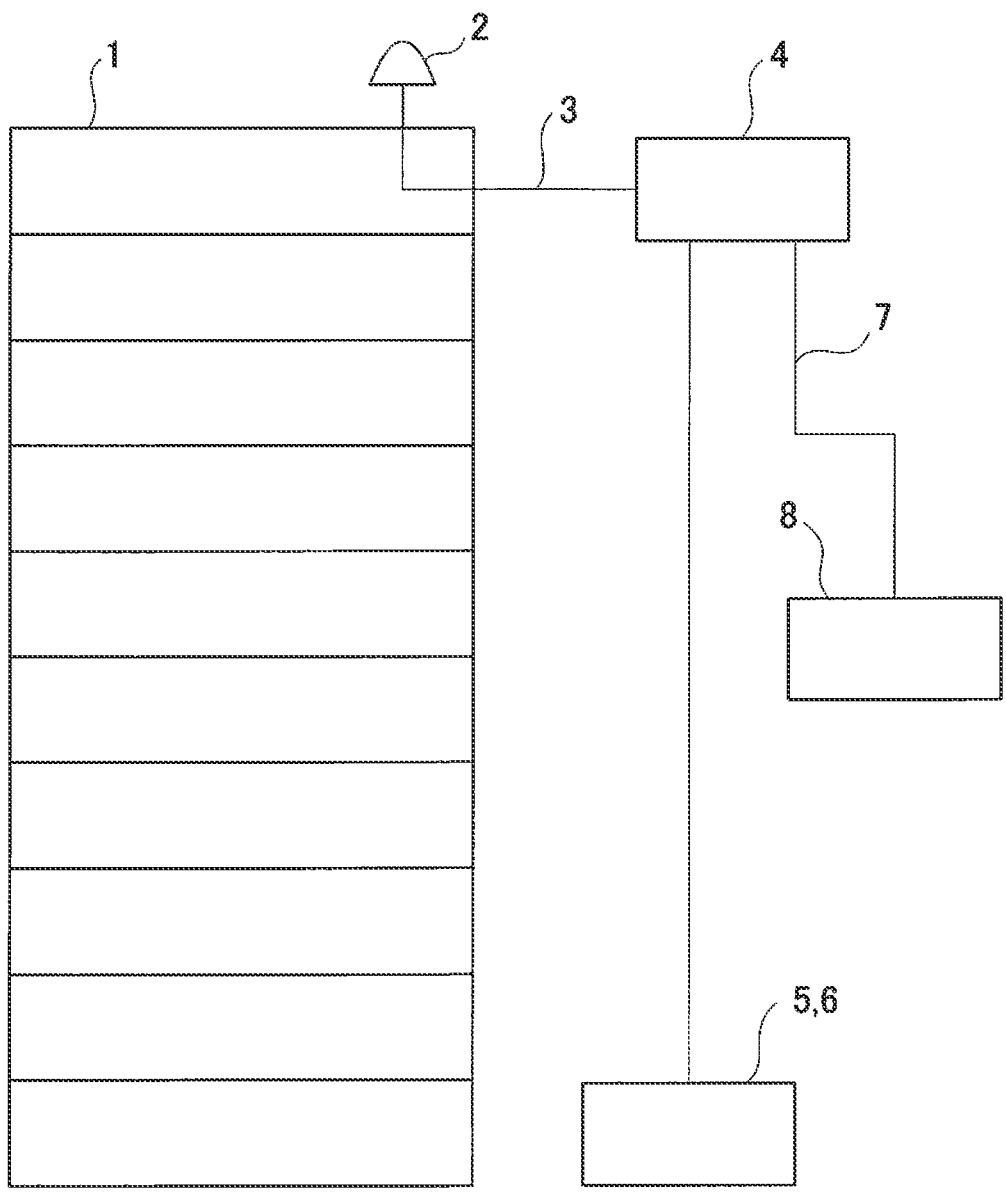
FIG. 1 is a schematical block diagram of a safety diagnosis system for structure according to an embodiment of the present invention.

In FIG. 1, reference numeral 1 denotes a structure such as a building or the like and reference numeral 2 denotes a GNSS receiver provided at a predetermined position of an upper floor (preferably a known position on a rooftop floor) of the structure 1. When a GNSS receiving unit of the GNSS receiver 2 receives a signal from a plurality of satellites, the GNSS receiver 2 uses a Doppler fluctuation of each satellite as obtained and detects a displacement of an object from its fluctuation value. Further, the GNSS receiver 2 detects a vibration based on the displacement as detected.

The GNSS receiver 2 is connected to a control device 4 such as a PC or the like via a GNSS cable 3. Further, the control device 4 is electrically connected to a display unit 5 such as a monitor and the like arranged at a predetermined position on a first floor and the like of the structure 1, and an operation unit 6 such as a keyboard, a mouse, etc. and connected to a communication unit 8 via a communication means such as a LAN 7, for instance. The control device 4 is capable of communicating with an external network via the communication unit 8. It is to be noted that the GNSS receiver 2 may be installed by separating from a GNSS receiving unit (to be described later) having a receiving function.

Figure 2:
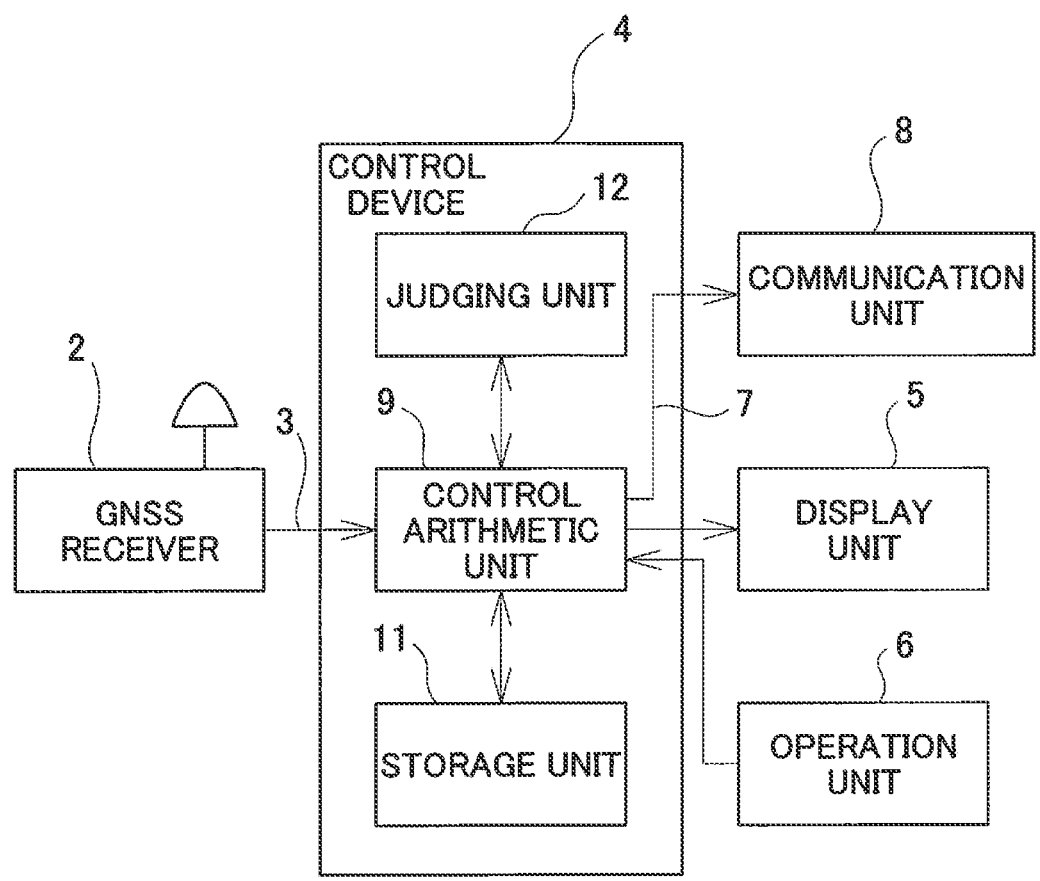
FIG. 2 is a block diagram to show a control device and its peripheral portion of the safety diagnosis system for structure according to the embodiment of the present invention.

Further, as shown in FIG. 2, the control device 4 has a control arithmetic unit 9 such as a CPU and the like, a storage unit 11 such as an HDD and the like, and a judging unit 12.

In the storage unit 11, an absolute coordinate (a reference absolute coordinate) of an installation position of the GNSS receiver 2 measured by the GNSS receiver 2 and in a condition without displacement before an earthquake or the like occurs and a threshold value with respect to the displacement for diagnosing safety of the structure 1 are stored. Further, in the storage unit 11, various types of programs are stored. These programs include: a displacement calculation program for calculating a displacement at the installation position of the structure 1 based on the reference absolute coordinate and an absolute coordinate of the installation position after the displacement, an absolute displacement curve preparing program for preparing an absolute displacement curve 13 (see FIG. 3A) of the structure 1 from the displacement of the installation position of the structure 1 from a structural calculation based on a structure of the structure 1 and the displacement of the installation position, a displacement calculation program for calculating a maximum displacement per each floor from the absolute displacement curve 13, an inter-layer displacement calculation program for calculating the maximum inter-layer displacement between each floor from the maximum displacement per each floor, an inter-layer deformation angle calculation program for calculating a maximum inter-layer deformation angle between each floor from the maximum inter-layer displacement and preparing an inter-layer deformation angle curve 14 (see FIG. 3B), a soundness judging program for judging a soundness of the structure 1 based on the maximum inter-layer deformation angle as obtained, a seismic intensity calculation program for calculating a seismic intensity based on an absolute acceleration obtained by second-order differentiation of an already obtained maximum displacement of each floor, a display program for displaying a judgement result and the like of the judging unit 12, to be described later, on the display unit 5, and other programs.

The judging unit 12 is configured so as to judge the condition of the structure 1, for instance, whether or not the structure 1 is safe, whether or not a detailed inspection is needed, whether or not the structure 1 is dangerous, and to evaluate the safety of the structure 1 based on the maximum inter-layer displacement and the maximum inter-layer deformation angle calculated by the control arithmetic unit 9 and according to the soundness judging program. It is to be noted that as a simple judgement of the safety, it may be judged to be dangerous if the largest maximum inter-layer deformation angle in the maximum inter-layer deformation angles between each floor, i.e. a maximum value of the maximum inter-layer deformation angle, exceeds a predetermined threshold value.

Figure 3A:
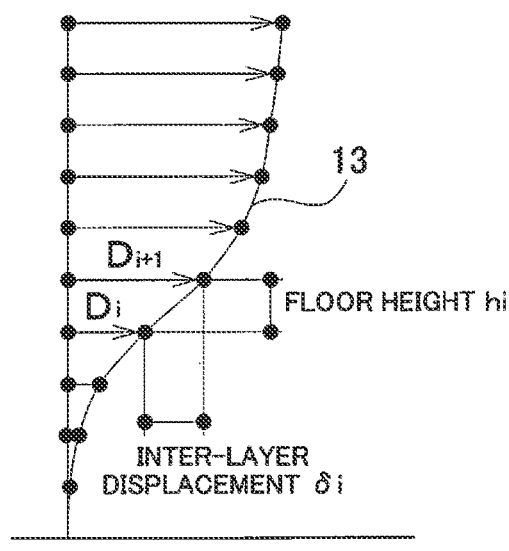
FIG. 3A is an explanatory drawing to explain a displacement of a structure and FIG. 3B is an explanatory drawing to explain a diagnosis of safety based on an inter-layer deformation angle curve.

Next, referring to FIG. 3A and FIG. 3B, description will be given on an operation of the safety diagnosis system for the structure.

After an earthquake occurs, in a case where an instruction to start a diagnosis is inputted by the operation unit 6, the control arithmetic unit 9 determines the absolute coordinate of the installation position of the GNSS receiver 2 on the rooftop of the structure 1 based on a receiving signal from the GNSS receiver 2 with high accuracy at a predetermined time interval, for instance, at 20 Hz or more. Further, the control arithmetic unit 9 stores the absolute coordinate as determined in the storage unit 11, compares the absolute coordinate as measured and the absolute coordinate of the installation position before the occurrence of the earthquake as stored in the storage unit 11 in advance, and calculates a displacement of the installation position.

Here, in a case where a performance of the structure 1 is evaluated only from an observation data of the upper floor, it is necessary to appropriately forecast a foundation input motion and to remove the foundation input motion from the observation data on the upper floor. In this case, a use of a method of acquiring an input motion of a foundation part in a back calculation manner by using a transfer function including an amplitude ratio of the upper floor with respect to the foundation part and a phase difference information or a design model of the structure, is assumed.

There is an advantage that the transfer function can be obtained easily, but on the other hand, it is necessary to determine a natural frequency of the structure uniquely. However, the natural frequency of the structure has a characteristic of fluctuating at any time during an earthquake. If the natural frequency of the structure is uniquely determined, an error factor becomes extremely large and exerts a bad influence on the accuracy of a final evaluation result.

Further, in a case where the design model of the structure is used, the accuracy of the final evaluation result depends on a modeling accuracy, and the model itself needs to be improved for accuracy improvement. Therefore, using of the design model is not suitable for a system of automatically deriving a final evaluation like the safety diagnosis system for structure of the present embodiment.

Figure 4:
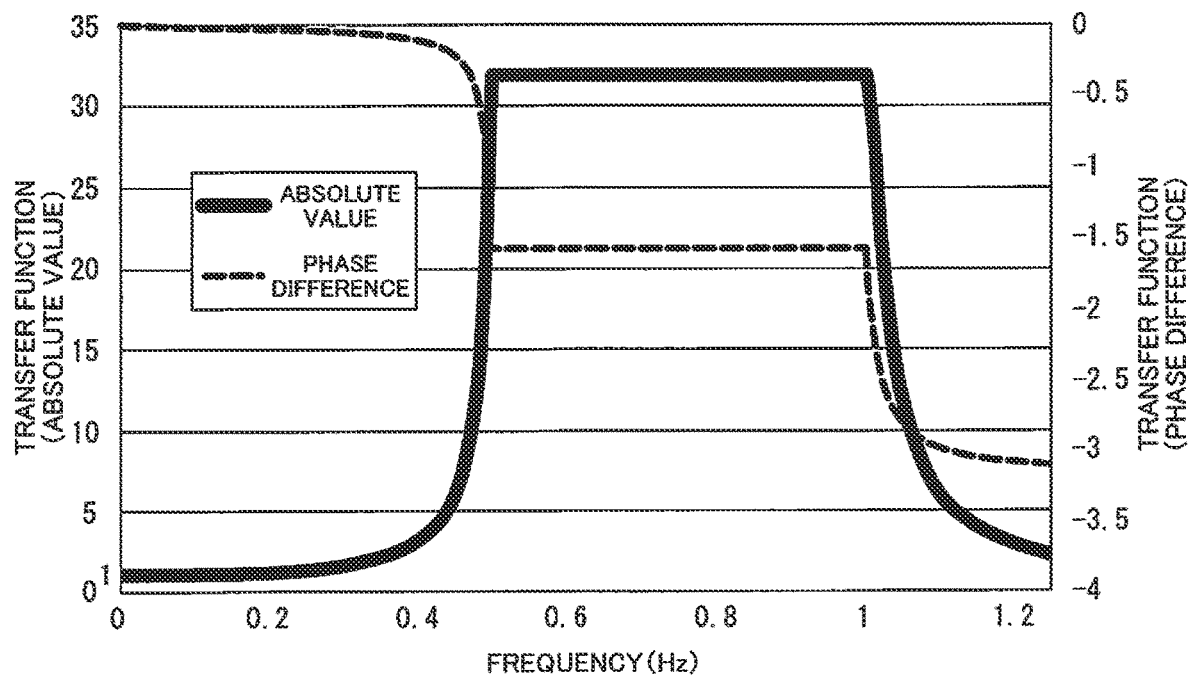
FIG. 4 is an explanatory drawing to explain an expansion transfer function used in the safety diagnosis system for the structure.

Therefore, in the present embodiment, an expansion transfer function obtained by expanding a transfer function, which is relatively simple and suitable for automation, is adopted. The expansion transfer function is devised so that, as shown in FIG. 4, a resonance point width of the transfer function is expanded based on a record of a micromotion at a normal time on an upper floor and a frequency analysis result of a record during an earthquake so that a natural frequency of the structure does not have to be uniquely determined, and a transfer function value, which is not dependent on the fluctuation of the natural frequency of the structure during the earthquake, i.e. which is appropriate with respect to the natural frequency at each time during the earthquake, is automatically applied.

The control arithmetic unit 9 prepares the absolute displacement curve 13 at the installation position (displacement measurement point) of the GNSS receiver 2. Further, the control arithmetic unit 9 calculates the absolute displacement of the foundation part of the structure 1 based on the expansion transfer function expanded by considering the absolute displacement curve 13 and the fluctuation during the earthquake of an arbitrary order-number of the natural frequency of the structure 1. Further, the control arithmetic unit 9 calculates a relative displacement of the structure 1 from the absolute displacement and the absolute displacement curve 13.

Further, the control arithmetic unit 9 multiplies an amplitude amount of each order mode of the relative displacement by a vibration shape in each order mode of the structure 1 assumed by a multi-dimensional function and calculates the maximum inter-layer displacement per each floor. Alternatively, the control arithmetic unit 9 applies an eigenvalue analysis to a mass and a layer rigidity calculated based on a design drawing of the structure 1 and obtains a mode shape of elasticity. Further, the control arithmetic unit 9 multiplies the mode shape of the elasticity by mode shapes of plurality of cases such as a case where the layer rigidity of each floor complies with the design drawing (coefficient α=1) and when the layer rigidity is increased/decreased by α (α>1 or α<1) times of the design drawing, calculates the maximum displacement per each floor and calculates the maximum inter-layer displacement per each floor.

It is to be noted that in a case where it is assumed that a maximum displacement of a predetermined layer is "Di" and a maximum displacement of a layer adjacent in an upward direction of the predetermined layer is "$D_{i+1}$", a maximum inter-layer displacement δi between Di and $D_{i+1}$ can be expressed by the following equation:

$$\delta i = D_{i+1} - Di$$

When the maximum inter-layer displacement of each floor with respect to the adjacent layer is obtained, the control arithmetic unit 9 divides the maximum inter-layer displacement as obtained, by the floor height of the structure 1 and calculates the maximum inter-layer deformation angle between each floor. Here, in a case where it is assumed that the height between each floor is "hi", the maximum inter-layer deformation angle between Di and $D_{i+1}$ can be expressed by the following equation:

$$\text{Maximum inter-layer deformation angle} = \delta i / hi$$

Figure 3B:
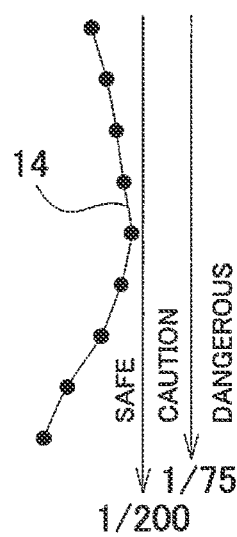

Further, the control arithmetic unit 9 prepares the inter-layer deformation angle curve 14 as shown in FIG. 3B from the maximum inter-layer deformation angle as obtained and acquires a seismic intensity scale per each floor at this time.

After the inter-layer deformation angle curve 14 is prepared, based on the soundness judging program, the judging unit 12 compares a threshold value stored in the storage unit 11 in advance, a maximum value of the maximum inter-layer displacement, and a maximum value of the maximum inter-layer deformation angle and evaluates the safety of the structure 1.

Lastly, since the control arithmetic unit 9 makes the display unit 5 display a diagnosis result screen 15 (see FIG. 5) having an evaluation result and the like by the judging unit 12, the safety diagnosis of the structure 1 by the safety diagnosis system for structure according to the present embodiment is finished.

Figure 5:
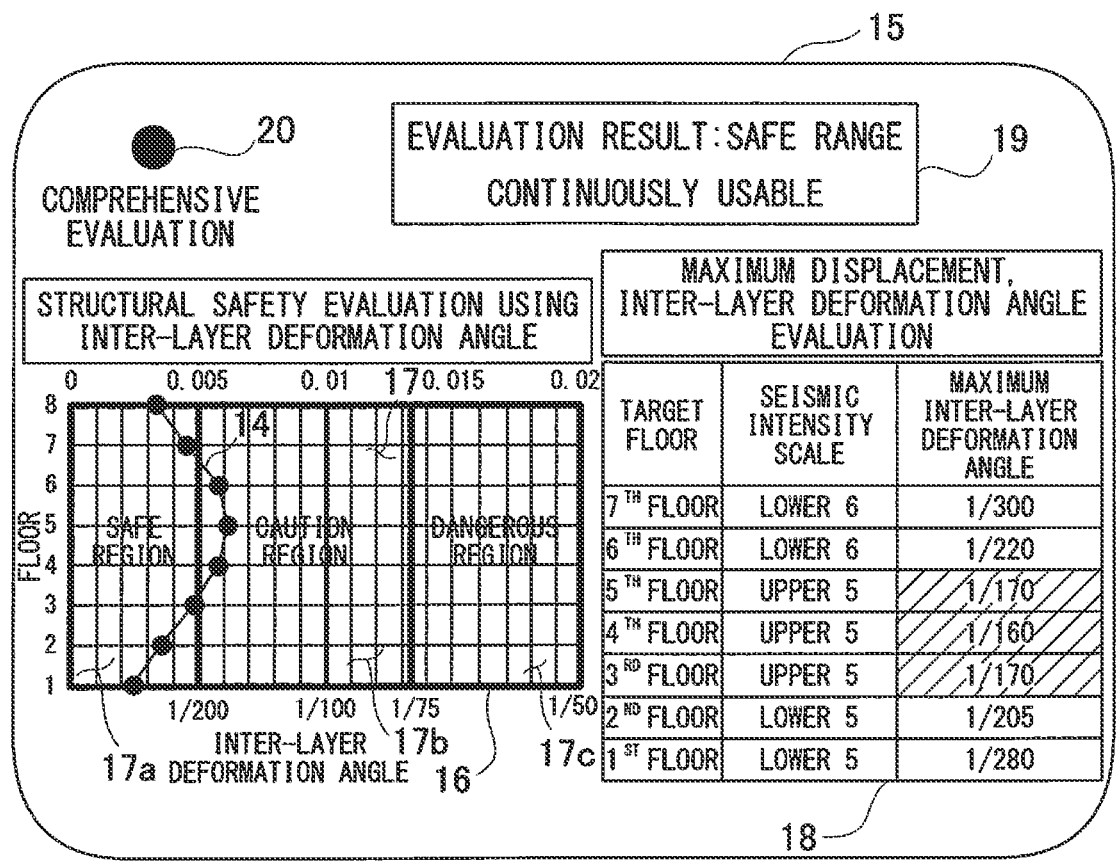
FIG. 5 is an explanatory drawing to show one example of a diagnosis result screen of the safety diagnosis system for structure according to the embodiment of the present invention.

FIG. 5 shows one example of the diagnosis result screen 15 displayed on the display unit 5.

The diagnosis result screen 15 has an evaluation result graph display area 16 showing a condition of the structure 1 as diagnosed based on the inter-layer deformation angle curve 14, a numerical value display area 18 displaying the seismic intensity scale and the maximum inter-layer deformation angle per each floor, an evaluation result display area 19 displaying the evaluation result of the judging unit 12 by letters, and a comprehensive evaluation display area 20 displaying the evaluation result of the judging unit 12 in color.

The evaluation result graph display area 16 takes the inter-layer deformation angle as an axis of abscissa and displays the inter-layer deformation angle curve 14 on a graph 17 with a safe region 17a on a left end portion, a dangerous region 17c on a right end portion and a caution region 17b on an intermediate portion. The evaluation result graph display area 16 is configured such that, from the relation between the inter-layer deformation angle curve 14 and the safe region 17a, the caution region 17b and the dangerous region 17c, which floor of the structure 1 is currently in what condition can be easily confirmed. Further, if even one part of the inter-layer deformation angle curve 14 is included in the dangerous region 17c, the structure 1 is judged to be in a dangerous condition. It is to be noted that the evaluation result graph display area 16 is set so that the three regions 17a to 17c have predetermined widths, but the evaluation result graph display area 16 may have two regions of the safe region 17*a* and the dangerous region 17*c*, or the caution region 17*b* may be divided and four or more areas may be provided.

Further, the numerical value display area 18 is configured so as to display the seismic intensity scale and the maximum inter-layer deformation angle per each floor as calculated by the control arithmetic unit 9, and detailed numerical values may be confirmed. Further, by a comparison with the threshold value by the judging unit 12, the floor judged to be in need of a detailed inspection and the floor judged to be dangerous are made identifiable (hatched in the drawing) by color or the like.

The evaluation result display area 19 is configured so as to display messages indicating within what range from being safe to being dangerous the condition of the structure 1 as diagnosed is in and how the structure 1 should be handled from now on and the like. For instance, in a case where the condition of the structure 1 is within the safe range and a repair or the like is not needed, as shown in FIG. 5, messages such as "Evaluation result: safe range", "Continuously usable" are displayed, and it is configured so that handling of the structure 1 can be easily judged.

The comprehensive evaluation display area 20 is configured such that the evaluation result by the judging unit 12 is displayed in colors selected as appropriate, such that if safe, the color is blue, if a detailed inspection is necessary, the color is yellow, if dangerous, the color is red, etc. and the evaluation result can be understood at one sight. It is to be noted that the comprehensive evaluation display area 20 may be a sound emitting means such as a buzzer and the like, and an alarm sound may be emitted in accordance with the judgement result. Further, it may be configured such that the comprehensive evaluation display area 20 displays color and also emit an alarm sound.

In the diagnosis result screen 15 in FIG. 5, four items, the evaluation result graph display area 16, the numerical value display area 18, the evaluation result display area 19, and the comprehensive evaluation display area 20 are displayed, but only either one of the evaluation result graph display area 16 as evaluated based on the inter-layer deformation angle curve 14 and the numerical value display area 18 as evaluated based on the seismic intensity scale and the maximum inter-layer deformation angle may be displayed. Further, other items such as the absolute displacement curve 13 and the like may be displayed on the diagnosis result screen 15.

Figure 6:
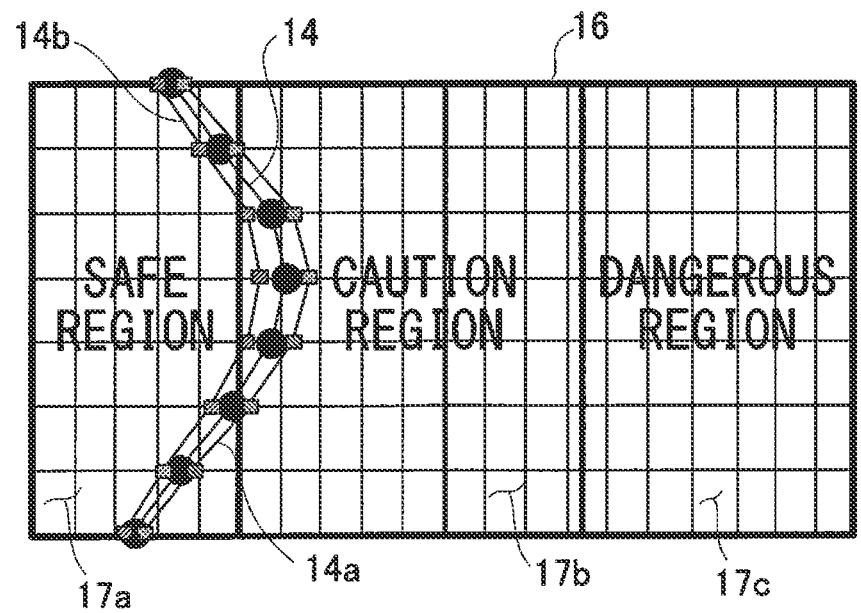
FIG. 6 is an explanatory drawing to show another example of an evaluation result graph display area in the diagnosis result screen.

Further, as shown in FIG. 6, an inter-layer deformation angle curve 14*a* expressing the maximum inter-layer deformation angle by an upper limit value and an inter-layer deformation angle curve 14*b* expressing the maximum deformation angle by a lower limit value are prepared, and the safety of the structure 1 may be diagnosed by the upper limit value or the lower limit value of the inter-layer deformation angle.

As described above, in the present embodiment, by the GNSS receiver 2, the absolute coordinate of the installation position on the rooftop of the structure 1 before the occurrence of the earthquake and after the occurrence of the earthquake can be directly measured. Therefore, the measurement result is not changed over time, deterioration of the accuracy is prevented, and a highly accurate displacement can be obtained. Further, if the absolute coordinate is measured at an interval of 10 Hz or more, for instance, 10 Hz is a frequency which is sufficiently high to express a lower-order natural frequency component of the structure, and by obtaining the displacement over an elapse of time, whether or not the structure 1 is vibrating can be detected. Therefore, the displacement immediately after the occurrence of the earthquake and a chronological change after the earthquake can also be measured. It is to be noted that it is only necessary that a measurement interval is sufficiently separate from the lower-order natural frequency of an object, an 0 Hz is one example of a case where an architectural structure with a first-order natural frequency of 1 Hz.

Therefore, a highly accurate maximum inter-layer displacement and maximum inter-layer deformation angle can be obtained, and the accuracy of the safety diagnosis of the structure 1 can be improved.

Further, the number of the GNSS receiver 2 used in the safety diagnosis system for structure in the present embodiment is only one, and a mechanism and the like for synchronizing the GNSS receivers with each other is not required. Therefore, a simplification of the system and a cost reduction can be realized.

Further, in the present embodiment, by the GNSS receiver 2, the absolute coordinate of the installation position on the rooftop of the structure 1 before the occurrence of the earthquake and the absolute coordinate of the installation position after the occurrence of the earthquake can be directly measured. Therefore, by comparing the two absolute coordinates, the residual displacement of the structure 1, which could not be measured by a conventional type acceleration sensor, can be measured. Further, the change over time after the occurrence of the earthquake can be measured.

Further, after the safety diagnosis of the structure 1, the control device 4 makes the display unit 5 display the diagnosis result screen 15 having the evaluation result graph display area 16, the numerical value display area 18, the evaluation result display area 19 and the comprehensive evaluation display area 20. Therefore, the condition of the structure 1 can be immediately grasped, and the dangerous floor and the subsequent countermeasure and the like can be easily grasped.

Further, since the control device 4 is capable of communicating with an external network via the communication unit 8, even if the operation unit 6 cannot be operated directly, the control device 4 can be remotely controlled from outside and the diagnosis of the safety with respect to the structure 1 can be performed. Further, based on the diagnosis result of each floor, an alarm may be issued relating to conditions such as a fall, a breakage, etc. of a ceiling, a facility equipment, a locker, a partition, and various types of pipes and the like.

It is to be noted that in the present embodiment, the control device 4 compares the absolute coordinate of the installation position of the GNSS receiver 2 installed on the rooftop of the structure 1 before the occurrence of the earthquake with the absolute coordinate of the installation position after the occurrence of the earthquake, obtains the maximum inter-layer displacement and the maximum inter-layer deformation angle of the structure 1 per each floor after the occurrence of the earthquake, and diagnoses the safety of the structure 1. On the other hand, the control device 4 stores the absolute coordinate of the installation position after the displacement, further measures the absolute coordinate of the installation position after a predetermined time, by a unit of an hour or two hours, for instance, has elapsed and compares the absolute coordinate after the displacement with the absolute coordinate after the predetermined time has elapsed so as to judge whether or not there is change over time. Here, as a standard of the evaluation of the maximum inter-layer deformation angle during the earthquake, a boundary portion between the safe region and the caution region in an RC structure is assumed to be $\frac{1}{200}$ and a boundary portion between the caution region and the dangerous region is assumed to be 1/75, for instance. Further, the standard is assumed similarly to be approximately 1/150 and 1/50 in an S structure. Further, as a standard of a residual deformation evaluation, a value of approximately 10 mm is adopted, but the setting is changed as appropriate depending on a height and the like of a structure.

By comparing the absolute coordinate of the installation position of the GNSS receiver 2 on the rooftop of the structure 1 after the occurrence of the earthquake with the absolute coordinate of the installation position after the predetermined time has elapsed and by obtaining the maximum inter-layer displacement and the maximum inter-layer deformation angle, the aftereffect variation of the structure 1 developing after the earthquake died down, can be detected.

Further, the absolute coordinate (reference absolute coordinate) of the installation position before the displacement is compared with the absolute coordinate of the installation position after the predetermined time has elapsed, the maximum inter-layer displacement and the maximum inter-layer deformation angle are obtained, and the judging unit 12 is made to evaluate. According to the evaluation, the diagnosis of the structure 1 including the aftereffect variation and the residual displacement of the structure 1 can be performed, and the diagnosis accuracy of the safety of the structure 1 can be further improved.

In the present embodiment, in the storage unit 11, the absolute coordinate of the installation position before the occurrence of the earthquake is stored, the absolute coordinate of the installation position and the absolute coordinate of the installation position measured by an instruction of the operation unit 6 after the occurrence of the earthquake are compared, and the safety diagnosis of the structure 1 is performed. On the other hand, it may be configured so that the absolute coordinate is measured by the GNSS receiver 2 at all times, and the absolute coordinate before the occurrence of the earthquake and the absolute coordinate after the occurrence of the earthquake is selected by the instruction of the operation unit 6.

Further, in the present embodiment, the diagnosis of the safety with respect to the displacement of the structure 1 caused by the earthquake is described, but it is needless to say that the safety diagnosis system for structure of the present embodiment can be applied also to the diagnosis of safety or living comfort with respect to the displacement of the structure 1 caused by a strong wind or the like.

Next, referring to FIG. 7A to FIG. 7C, description will be given on an application example of the present invention. It is to be noted that in FIG. 7A to FIG. 7C, the same component as shown in FIG. 1 is referred by the same symbol, and the description will be omitted.

In the application example, at a predetermined position on an upper floor of the structure 1 (preferably a known position on the rooftop floor), a first GNSS receiver 31 is provided, and a second GNSS receiver 32 is further provided.

In a first application example as shown in FIG. 7A, the second GNSS receiver 32 is provided on the upper floor, that is, on the same floor as the first GNSS receiver 31, and based on the respective receiving results, the control device 4 calculates the positional displacement and vibration of the installation points respectively. By providing the first GNSS receiver 31 and the second GNSS receiver 32 on the same floor, an inter-layer deformation angle per each floor of the structure 1 can be calculated by the control device 4. Further, the control device 4 can calculate the twist generated in the structure 1 from a displacement difference and a directional difference in displacements as obtained from the first GNSS receiver 31 and the second GNSS receiver 32.

In a second application example as shown in FIG. 7B, the second GNSS receiver 32 is installed on an intermediate floor, that is, on the floor different from the first GNSS receiver 31. By providing the first GNSS receiver 31 and the second GNSS receiver 32 on different floors, the calculation accuracy of the inter-layer deformation angle by the control device 4 is improved, and further, the mode of displacement and vibration caused in the structure 1 can be calculated.

In a third application example as shown in FIG. 7C, the second GNSS receiver 32 is provided on the first floor. By providing the GNSS receiver 32 on the first floor, a displacement amount of the structure 1 itself excluding a displacement of the ground surface can be obtained.

Further, as another application example, two or more of the second GNSS receivers 32 may be provided on set positions other than the first GNSS receiver 31, and the displacement and vibration of the plurality of installation positions may be obtained by the control device 4 and applied to the safety diagnosis.

By using the GNSS receiver, description will be given on a method of obtaining the vibration and the displacement of the installation position of the GNSS receiver.

As described above, in the present invention, a signal from the GNSS receiver is obtained at a predetermined time interval, but based on the signal obtained at the predetermined time interval, a vibration information (vibration cycle, vibration waveform) matching an object to be measured can be measured. Therefore, by means of the GNSS receiver, the control device 4 can obtain the displacement of the structure 1 with high accuracy and the vibration of the structure 1 during an earthquake, a strong wind or the like can be measured.

Figure 8:
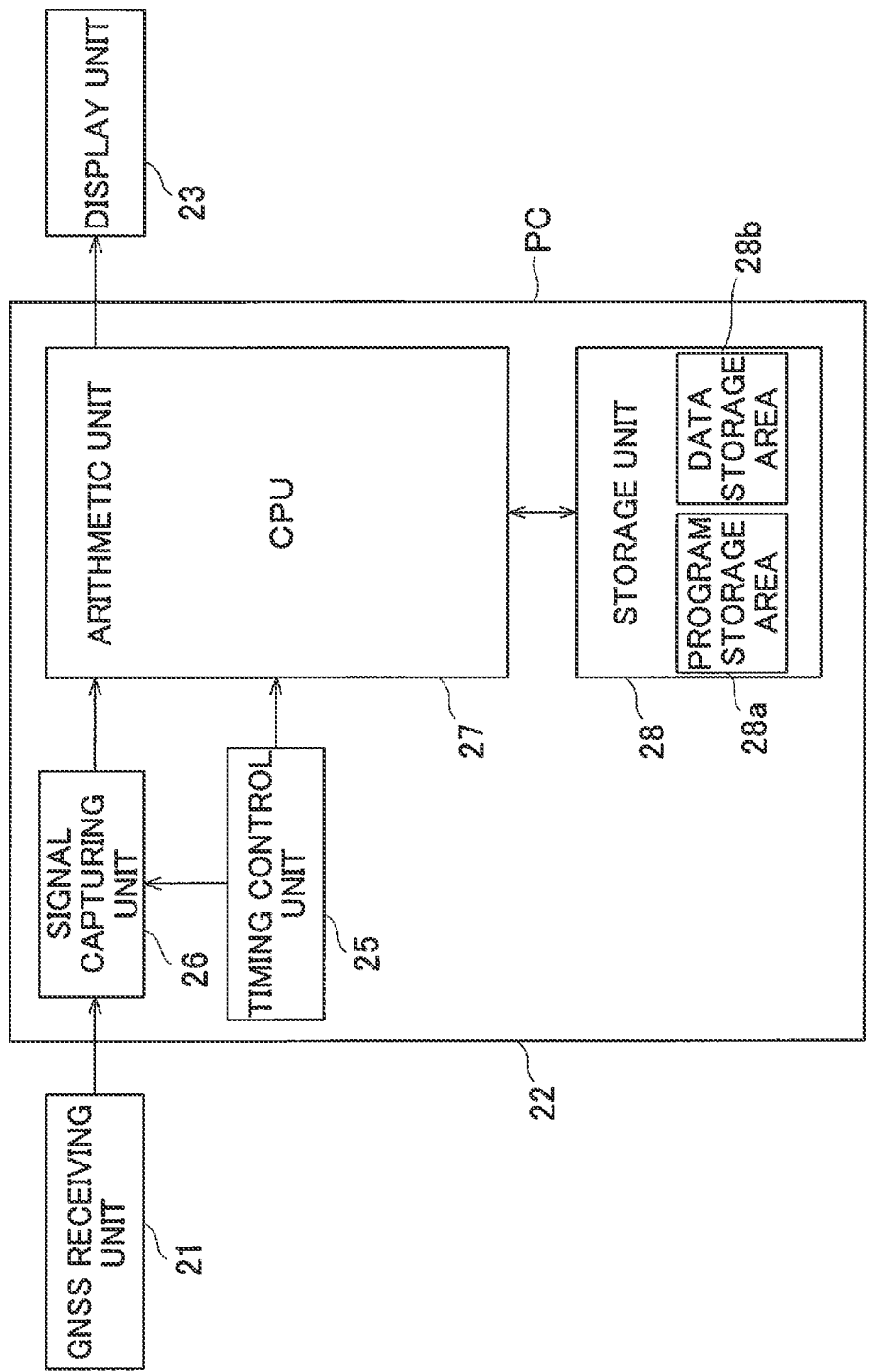
FIG. 8 is a block diagram to show an approximate arrangement of a vibration detecting device according to the embodiment of the present invention.

FIG. 8 shows a vibration detecting device using the GNSS receiver 2, and in FIG. 8, the GNSS receiver 2 is shown by the GNSS receiving unit 21 and an arithmetic processing device 22. Referring to FIG. 8, a vibration detecting device according to the present embodiment will be described below in detail.

The GNSS receiving unit 21 is configured so as to receive radio waves from a plurality of GNSS satellites and to output a receiving signal per each GNSS satellite and provided each at a measurement point. As the arithmetic processing device 22, a PC is used, for instance. Further, the result calculated by the arithmetic processing device 22, for instance, a vibration waveform, a vibration frequency and the like, are displayed on the display unit 23.

Further, a description will be given on an approximate arrangement of the arithmetic processing device 22.

The arithmetic processing device 22 primarily comprises a timing control unit 25, a signal capturing unit 26, an arithmetic unit (CPU) 27, and a storage unit 28.

The timing control unit 25 controls a capturing timing of a signal which the GNSS receiving unit 21 receives from the GNSS satellite or issues a timing signal for synchronization control. For instance, the timing control unit 25 issues to the signal capturing unit 26 a timing signal for capturing the receiving signal at a set time interval Δt.

The signal capturing unit 26 captures the receiving signal as inputted from the GNSS receiving unit 21 in accordance with the timing signal from the timing control unit 25. Further, the signal capturing unit 26 performs a signal processing such as amplification of the receiving signal, A/D conversion and the like and separates the receiving signal to a signal of the positional information, a signal of the time information and the like.

Based on the signal from the signal capturing unit 26, the arithmetic unit 27 calculates an altitude of the GNSS satellite or sets a reference GNSS satellite. Further, the arithmetic unit 27 calculates a coordinate position of the GNSS receiving unit 21, further, calculates a time displacement of the coordinate position of the GNSS receiving unit 21 and further, calculates the vibration waveform, the vibration frequency and the like based on the calculation result.

The storage unit 28 has a program storage area 28a and a data storage area 28b, and the program storage area 28a stores various types of programs. These programs include: a program for calculating a position and an altitude of the GNSS satellite from the receiving signal, or further, a positioning program for calculating a position of the GNSS receiving unit 21, a vibration detecting program for acquiring a temporal deviation of the position obtained by calculation in the positioning program per every predetermined time, and by further integrating the temporal deviation, for calculating the vibration waveform and the vibration frequency, a program for displaying results calculated by the arithmetic unit 27 such as the vibration waveform and the like, for instance, on the display unit 23, and other programs.

Further, in the data storage area 28b, data such as the receiving signal outputted from the signal capturing unit 26, the results calculated by the arithmetic unit 27 at the time interval Δt and the like are stored in correspondence with the synchronization signal from the timing control unit 25. Further, in the data storage area 28b, the vibration detection result such as the vibration waveform and the like calculated by the arithmetic unit 27 are similarly stored.

Description will be given below on an operation of the vibration detecting device.

When the GNSS satellite is observed at one point, a survey during that period is expressed as a sum of unknown numbers as follows.

[Equation 1]

$$\varphi(t) = \{\rho(t) + c \times (\text{clock}(t)_{sat} + \text{clock}(t)_{rcv}) + \text{Trop}(t) - \text{Iono}(t)\} \times (f/c) + N + W(t) + n(t) \quad \text{(Equation 1)}$$

Here,
Φ(t): Carrier wave phase at time t [cycle]
ρ(t): Distance to GNSS satellite at time t [m]
Trop(t): Tropospheric delay amount at time t [m]
Iono(t): Ionospheric delay amount at time t [m]
clock(t)$_{sat}$: GNSS satellite clock offset at time t [s]
clock(t)$_{rcv}$: Receiver clock offset at time t [s]
W(t): Wind-up [cycle]
n(t): Observation noise [cycle]
f: Carrier wave frequency [Hz]
c: Light velocity [m/s]
N: Ambiguity [cycle]

Further, in the equation, "sat" is a subscript indicating the GNSS satellite and "rcv" is a subscript indicating the receiver.

However, in a case where an adjacent observation interval (time interval Δt) is short, there is almost no change in many of the unknown numbers in the equation as given above.

Further, a fluctuation amount of the GNSS satellite clock and a fluctuation amount of the receiver clock are approximately several to several tens of nano seconds (ns). When this fluctuation amount is converted to a length, the length corresponds to several hundred m.

Further, the GNSS satellite clock offset is given by a navigation calendar, and if this is assumed to be correct, most of the offset amounts other than a noise can be cancelled. On the other hand, regarding the receiver clock offset, since there is no such information, it is difficult to accurately predict. For this reason, a specific GNSS satellite is determined as a reference GNSS satellite, by taking differences in observation values between the reference GNSS satellite and other GNS satellite, and the receiver clock error is cancelled. In the following equation 2, a first GNSS satellite is made the reference GNSS satellite, and a difference from a second GNSS satellite is taken. This can be sequentially applied to a third GNSS satellite and after, and an equation of a single receiving GNSS satellite can be prepared.

[Equation 2]

$$\Delta\varphi_{sat(1-2)} = (\Delta\rho_{sat(1-2)} + c \times \Delta clock_{sat(1-2)} + \Delta Trop_{sat(1-2)} - \Delta Iono_{sat(1-2)}) \times (f/c) + \Delta N_{sat(1-2)} + \Delta W_{sat(1-2)} + n_{sat(1-2)} \quad \text{(Equation 2)}$$

Here,
$\Delta\Phi_{sat(1-2)}$: difference of carrier wave phase of satellite (1)–satellite (2) [cycle]
$\Delta\rho sat_{(1-2)}$: distance difference of satellite (1)–satellite (2) [m]
$\Delta clock_{sat(1-2)}$: satellite clock offset difference of satellite (1)–satellite (2) [m]
$\Delta Trop_{sat(1-2)}$: difference in tropospheric delay amount of satellite (1)–satellite (2) [m]
$\Delta Iono_{sat(1-2)}$: difference in ionospheric delay amount of satellite (1)–satellite (2) [m]

Processing as given above is carried out also for the observation value at other time (t2, for instance), and a difference between each measurement time is obtained. Here, since a Windup effect composed of the tropospheric delay, the ionospheric delay and ambiguity, and an apparent phase change of the GNSS satellite can be assumed to be approximately a same amount in a short time, the Windup effect is cancelled in equation 3 as given below. Further, in a case where the same navigation calendar is used, a clock offset can be estimated by the same polynomial equation.

[Equation 3]

$$\Delta\varphi(t+1)_{sat(1-2)} - \Delta\varphi(t)_{sat(1-2)} = \{(\Delta\rho(t+1)_{sat(1-2)} - \Delta\rho(t)_{sat(1-2)}) + c \times (\Delta clock(t+1)_{sat(1-2)} - \Delta clock(t)_{sat(1-2)})\} \times (f/c) + \Delta n_{sat(1-2)} \quad \text{(Equation 3)}$$

Here, assuming that a distance between a GNSS satellite i and the GNSS receiving unit 21 is "ρi", it may be expressed as follows.

[Equation 4]

$$\rho_i = \sqrt{(X_{sat(i)} - X_{rcv})^2 + (Y_{sat(i)} - Y_{rcv})^2 + (Z_{sat(i)} - Z_{rcv})^2} \quad \text{[Equation 4]}$$

Here,
$X_{sat(i)}$: X-coordinate of GNSS satellite i, $X_{rcv}$: X-coordinate of GNSS receiving unit 21,
$Y_{sat(i)}$: Y-coordinate of GNSS satellite i, $Y_{rcv}$: Y-coordinate of GNSS receiving unit 21,
$Z_{sat(i)}$: Z-coordinate of GNSS satellite i, $Z_{rcv}$: Z-coordinate of GNSS receiving unit 21

When equation 4 is applied to equation 3, if there are three or more combinations of the GNSS satellites, a receiver movement coordinate changed between time t1 and time t2 can be solved.

As conditions for performing this solution, it is required that the reference GNSS satellite is the same GNSS satellite even between different times (t1, t2) and that three or more common GNSS satellites observed other than the reference GNSS satellite are needed.

Further, it is required as conditions that there is no cycle slip between the data of each GNSS satellite received at the two different times and that a phase counter has not been reset by power shut-down of the GNSS receiving unit.

It is to be noted that in a case where cycle slip occurs or in a case where the phase counter has been reset or the like, it is only necessary to perform processing for ensuring continuity of a phase fluctuation amount (estimation of an integer value bias) or to exclude the data of a shut-down portion of the phase.

The data obtained by the solution as given above is a difference amount between a position at an observation time which becomes a reference and a position at an observation time after. Therefore, an actual movement amount can be obtained by integrating the respective difference amounts.

Here, regarding an obtainment time interval $\Delta t$ of the receiving signal as captured from the GNSS receiving unit 21, a minimum time interval is approximately 10 ms (100 Hz) in practice.

Further, as a maximum time interval, the following limitation applies. The radio wave emitted from the GNSS satellite is updated to the latest every two hours. In the solution in the present embodiment, it is necessary that a parameter in calculation is the same, and further, at least two points are needed. For this reason, it is necessary to obtain the data of at least two points within 2 hours, and the maximum time interval is 1 hour.

Therefore, the time interval as set is within a range from 10 ms to ½ of the time interval at which the signal from the satellite is updated, and the time interval is set to approximately ⅒ of a vibration cycle of a body to be measured as expected.

Figure 9:
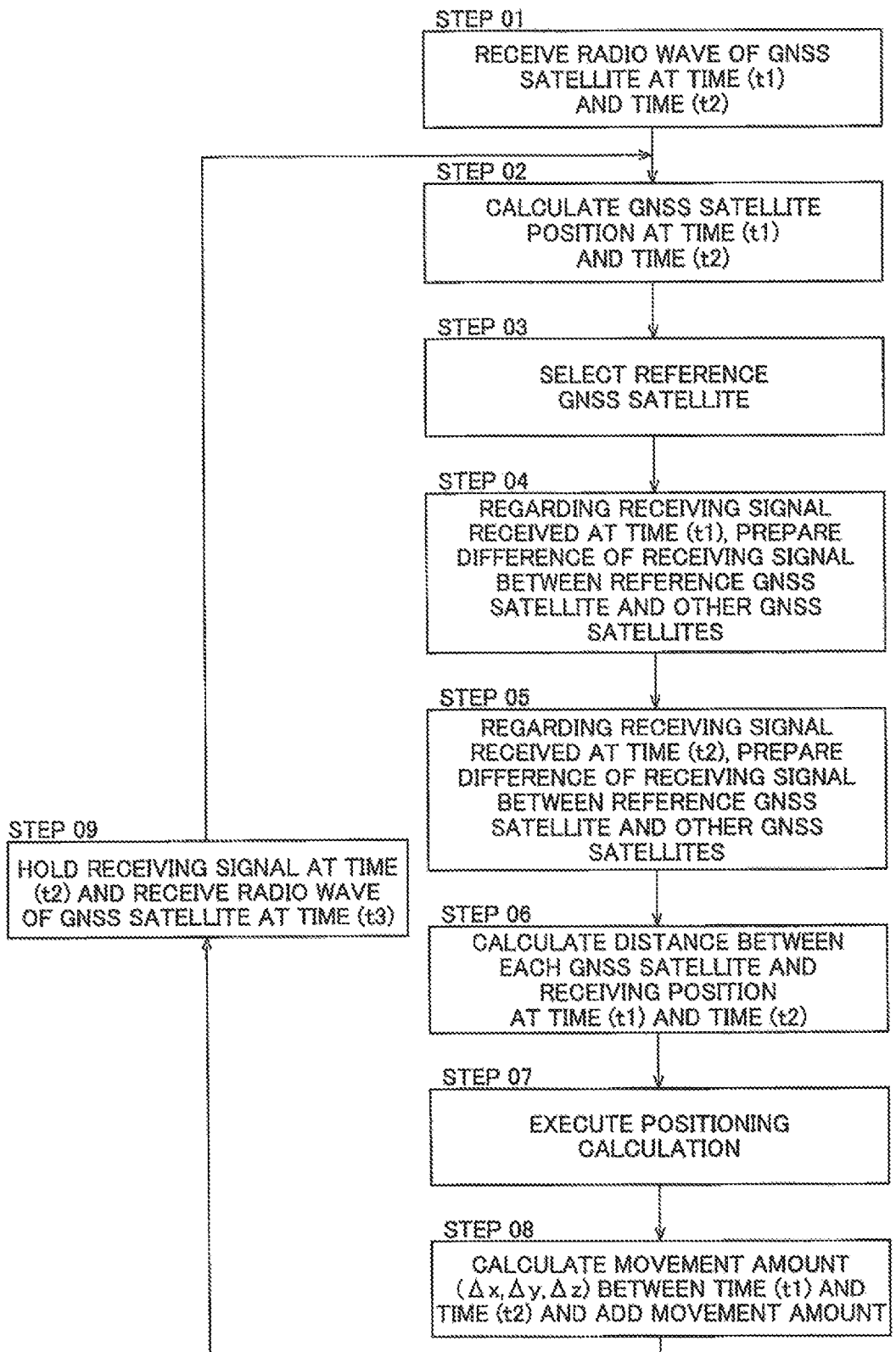
FIG. 9 is a flow chart to show an operation of the vibration detecting device.

Further description will be given by referring to FIG. 9.

(Step 01) The measurement is started, and at time t1, the GNSS receiving unit 21 receives the radio wave from the plurality of GNSS satellites and a receiving signal is obtained from the GNSS receiving unit 21. Further, receiving signals as received from the plurality of GNSS satellites at time t2 after $\Delta t$ is obtained from the GNSS receiving unit 21.

(Step 02) The position of each of the GNSS satellites is calculated respectively from the receiving signals at time t1 and time t2.

(Step 03) An elevation angle of each of the GNSS satellites at time t1 is calculated respectively, and the GNSS satellite with the largest elevation angle is made the reference GNSS satellite.

(Step 04) Regarding the receiving signal received at time t1, the difference between the reference GNSS satellite and the other GNSS satellites is prepared.

(Step 05) Regarding the receiving signal received at time t2, the difference between the reference GNSS satellite and the other GNSS satellites is prepared.

(Step 06) A distance between each of the GNSS satellites and the receiving positions (measurement points) at time t1 and time t2 is calculated in the combination of the receiving signal and a similar GNSS satellite.

(Step 07) Based on the data (distance between the GNSS satellite and the measurement point) obtained at Step 06, the measurement point at time t2 based on time t1 is positioned (coordinate (x, y, z) measurement).

(Step 08) From the coordinate at time t2 with reference to time t1, deviations $\Delta x$, $\Delta y$ and $\Delta z$ are obtained, and the movement amount ($\Delta x$, $\Delta y$, $\Delta z$) are added to an entire movement amount (integrated).

(Step 09) The receiving signal at time t2 is stored, and the radio wave from the GNSS satellite at time t3 is received and obtained as a receiving signal. Regarding the receiving signal at time t2 and the receiving signal at time t3, processing from Step 02 to Step 08 is executed.

At a predetermined time interval, the data is obtained continuously from the GNSS satellite, and at every adjacent time, deviations $\Delta x$, $\Delta y$ and $\Delta z$ are obtained and by executing integration, continuous vibration measurement becomes possible.

Further, as described above, within the range from 10 ms to ½ of the time interval at which the signal from the satellite is updated, the obtainment time interval of the data can be set in correspondence with a vibrating condition of the body to be measured. Therefore, an optimum vibration measurement corresponding to the vibrating condition of the body to be measured can be carried out.

Figure 10:
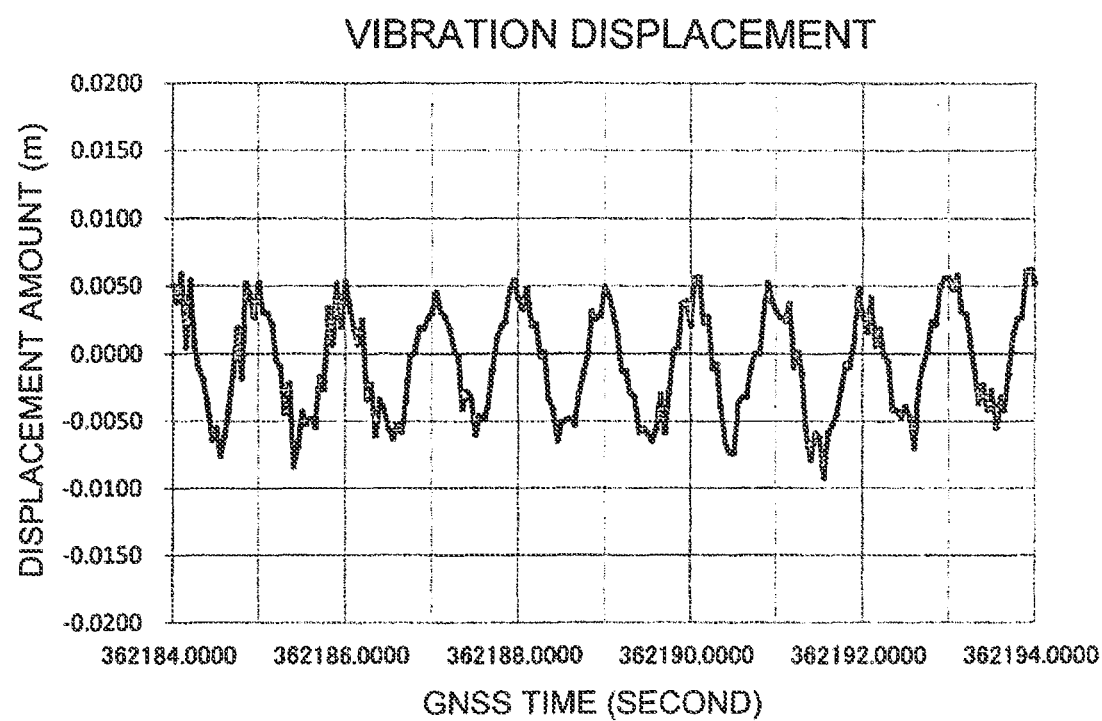
FIG. 10 is a drawing to show a vibration waveform obtained by the vibration detecting device.

The observation data obtained in an experiment is shown in FIG. 10.

As conditions of the experiment, it is set such that a vibration detection object, on which the GNSS receiving unit 21 is installed, is vibrated with an amplitude of ±5 mm and at 1 Hz, and the receiving signal of the GNSS receiving unit 21 is captured at an interval of 0.05 seconds.

In FIG. 10, a state of vibrating regularly with the amplitude of approximately ±5 mm can be observed. It is to be noted that in FIG. 10, an axis of abscissa indicates a GNSS time and a unit of an axis of ordinate is "m".

Further, in order to confirm a periodicity, the observation data was subjected to the frequency resolution by an FFT. The result is shown in FIG. 11.

Figure 11:
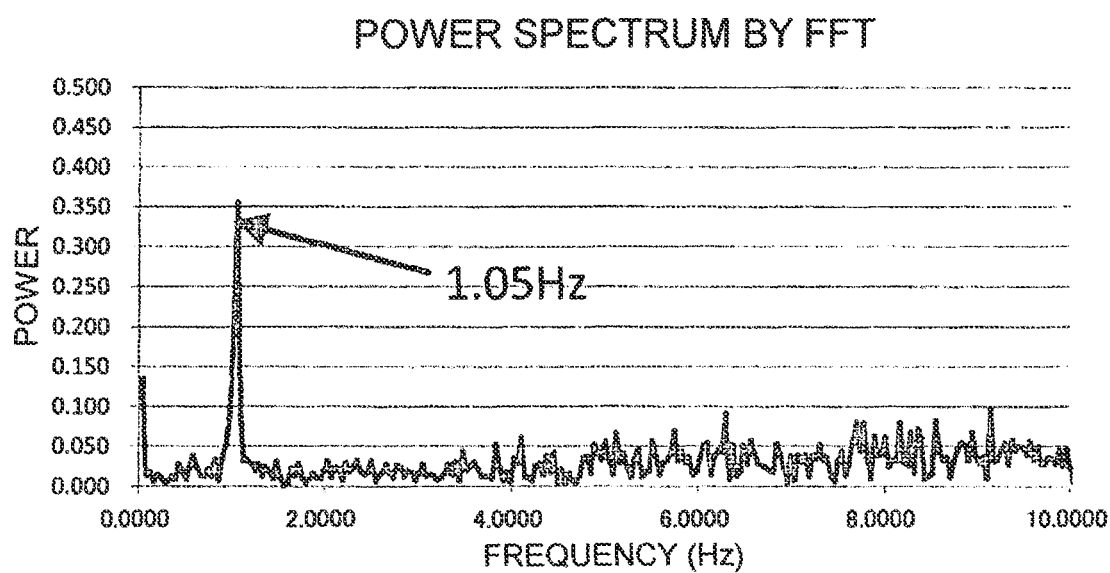
FIG. 11 is a drawing to show a frequency characteristic of a vibration as measured.

From FIG. 11, it is confirmed that a power spectrum appears at the position of 1 Hz set in the experiment and that the vibration measured in the present embodiment reflects the conditions as set in the experiment.

In the present embodiment, the signal from the GNSS satellite is received by the GNSS receiving unit 21 at the predetermined time interval, a temporal displacement at the point (measurement point) at which the GNSS receiving unit 21 is installed is obtained, the temporal displacement is integrated, and the vibration is measured.

Further, since the temporal displacement (deviation) is a difference of the absolute coordinate measured by the GNSS receiving unit 21 and is a difference of the measured value between close times, an error based on the elapse of time is extremely small. Further, even in a case where an error factor is included in the measured value measured by the GNSS receiving unit 21, by taking a difference, the error factor is offset, and an extremely highly accurate deviation ($\Delta x$, $\Delta y$, $\Delta z$) can be obtained.

Further, by adding the deviation, the temporal displacement of the installation position of the GNSS receiving unit 21 can be obtained. Further, based on the displacement, an information relating to the vibration such as an amplitude, a vibration waveform, a vibration frequency and the like can be obtained.

Further, the displacement of the installation position of the GNSS receiving unit 21 is a position where the vibration is removed and is judged to be a coordinate which indicates a center of the vibration waveform.

Further, the installation position when the vibration stops is obtained by adding a total sum of the deviations to an initial coordinate of the installation position of the GNSS receiving unit 21. As described above, since the error factor is offset in the process of acquiring the deviation, the installation position of the GNSS receiving unit 21 is measured with high accuracy.

Further, by applying the vibration detecting device according to the present embodiment to the safety diagnosis system for structure, the diagnosis of safety of the structure can be made with high accuracy and high reliability.

The invention claimed is:

1. A safety diagnosis system for structure comprising:
one GNSS receiver installed on a rooftop of a structure,
a control device having
a storage unit configured to store
a reference absolute coordinate of said GNSS receiver,
a threshold value with respect to a displacement angle for diagnosing safety of said structure,
a program which
prepares an absolute displacement curve of said structure based on a displacement between an absolute coordinate measured by said GNSS receiver after the displacement and said reference absolute coordinate and on a structural calculation of said structure, and
prepares an inter-layer deformation angle curve by
calculating an absolute displacement of a foundation part of said structure based on said absolute displacement curve and an expansion transfer function which is expanded by considering a fluctuation during an earthquake of an arbitrary order-number of a natural frequency of said structure,
calculating a relative displacement of said structure based on said absolute displacement and said absolute displacement curve,
calculating a maximum inter-layer displacement per each floor based on an amplitude amount of said relative displacement and a vibration shape of said structure and
calculating a maximum inter-layer deformation angle per each floor by dividing the maximum inter-layer displacement by the floor height of said structure, and
a judging unit configured to perform a diagnosis of the safety of said structure based on the maximum interlayer displacement, the maximum inter-layer deformation angle and said threshold value, and a display unit,
wherein said control device is configured to calculate the maximum inter-layer displacement and the maximum inter-layer deformation angle per each floor and the inter-layer deformation angle curve based on a displacement of said reference absolute coordinate and said absolute coordinate and
said program is configured to make said display unit display a diagnosis result of said structure as evaluated by said judging unit based on a comparison between at least one of the maximum inter-layer deformation angle or said inter-layer deformation angle curve and said threshold value.

2. A safety diagnosis system for structure according to claim 1, wherein a diagnosis result screen is displayed on said display unit, said diagnosis result screen comprises an evaluation result graph display area, a safe region and a dangerous region are separated and displayed on said evaluation result graph display area, and shows in what range from the safe region to the dangerous region said inter-layer deformation angle curve exists.

3. A safety diagnosis system for structure according to claim 2, wherein said diagnosis result screen further comprises a numerical value display area for displaying the maximum inter-layer displacement and the maximum inter-layer deformation angle per each floor of said structure.

4. A safety diagnosis system for structure according to claim 3, wherein said diagnosis result screen further comprises an evaluation result display area for displaying a diagnosis result by said judging unit in words and a comprehensive evaluation display area displaying said diagnosis result in color.

5. A safety diagnosis system for structure according to claim 3, wherein said GNSS receiver comprises one GNSS receiving unit installed at a measuring position and for receiving at least three signals from satellites, and an arithmetic processing device configured so as to obtain at least three receiving signals outputted from said GNSS receiving unit at a predetermined time interval, to obtain the at least three receiving signals from said GNSS receiving unit at two sequential times at the predetermined time interval, to obtain a deviation of said measuring position from the at least three received signals at the two sequential times, to integrate said deviation and to obtain a vibration of said measuring position.

6. A safety diagnosis system for structure according to claim 5, wherein said time interval is selected within a range from 10 ms to ½ of the time interval at which a signal issued from the satellite is updated and further set to 1/10 or less of an estimated vibration cycle of a body to be measured.

7. A safety diagnosis system for structure according to claim 5, wherein said displacement of said absolute coordinate is an addition of a total sum of said deviations and an initial value of said absolute coordinate measured by said GNSS receiver.

8. A safety diagnosis system for structure according to claim 4, wherein, after the diagnosis of said structure is performed by said judging unit, and further, after a predetermined time has elapsed, said GNSS receiver measures an absolute coordinate of an installation position of said GNSS receiver, said control device calculates a displacement of said installation position over time from an absolute coordinate as measured in a previous diagnosis and said absolute coordinate of said installation position after the predetermined time has elapsed, and said judging unit diagnoses safety of said structure based on said displacement over time.

9. A safety diagnosis system for structure according to claim 8, wherein said GNSS receiver comprises one GNSS receiving unit installed at a measuring position and for receiving at least three signals from satellites, and an arithmetic processing device configured so as to obtain at least three receiving signals outputted from said GNSS receiving unit at a predetermined time interval, to obtain the at least three receiving signals from said GNSS receiving unit at two sequential times at the predetermined time interval, to obtain a deviation of said measuring position from the at least three received signals at the two sequential times, to integrate said deviation and to obtain a vibration of said measuring position.

10. A safety diagnosis system for structure according to claim 4, wherein said GNSS receiver comprises one GNSS receiving unit installed at a measuring position and for receiving at least three signals from satellites, and an arithmetic processing device configured so as to obtain at least three receiving signals outputted from said GNSS receiving unit at a predetermined time interval, to obtain the at least three receiving signals from said GNSS receiving unit at two sequential times at the predetermined time interval, to obtain a deviation of said measuring position from the at least three received signals at the two sequential times, to integrate said deviation and to obtain a vibration of said measuring position.

11. A safety diagnosis system for structure according to claim 10, wherein said displacement of said absolute coordinate is an addition of a total sum of said deviations and an initial value of said absolute coordinate measured by said GNSS receiver.

12. A safety diagnosis system for structure according to claim 10, wherein said time interval is selected within a range from 10 ms to ½ of the time interval at which a signal issued from the satellite is updated and further set to ¹/₁₀ or less of an estimated vibration cycle of a body to be measured.

13. A safety diagnosis system for structure according to claim 3, wherein, after the diagnosis of said structure is performed by said judging unit, and further, after a predetermined time has elapsed, said GNSS receiver measures an absolute coordinate of an installation position of said GNSS receiver, said control device calculates a displacement of said installation position over time from an absolute coordinate as measured in a previous diagnosis and said absolute coordinate of said installation position after the predetermined time has elapsed, and said judging unit diagnoses safety of said structure based on said displacement over time.

14. A safety diagnosis system for structure according to claim 13, wherein said GNSS receiver comprises one GNSS receiving unit installed at a measuring position and for receiving at least three signals from satellites, and an arithmetic processing device configured so as to obtain at least three receiving signals outputted from said GNSS receiving unit at a predetermined time interval, to obtain the at least three receiving signals from said GNSS receiving unit at two sequential times at the predetermined time interval, to obtain a deviation of said measuring position from the at least three received signals at the two sequential times, to integrate said deviation and to obtain a vibration of said measuring position.

15. A safety diagnosis system for structure according to claim 2, wherein, after the diagnosis of said structure is performed by said judging unit, and further, after a predetermined time has elapsed, said GNSS receiver measures an absolute coordinate of an installation position of said GNSS receiver, said control device calculates a displacement of said installation position over time from an absolute coordinate as measured in a previous diagnosis and said absolute coordinate of said installation position after the predetermined time has elapsed, and said judging unit diagnoses safety of said structure based on said displacement over time.

16. A safety diagnosis system for structure according to claim 15, wherein said GNSS receiver comprises one GNSS receiving unit installed at a measuring position and for receiving at least three signals from satellites, and an arithmetic processing device configured so as to obtain at least three receiving signals outputted from said GNSS receiving unit at a predetermined time interval, to obtain the at least three receiving signals from said GNSS receiving unit at two sequential times at the predetermined time interval, to obtain a deviation of said measuring position from the at least three received signals at the two sequential times, to integrate said deviation and to obtain a vibration of said measuring position.

17. A safety diagnosis system for structure according to claim 2, wherein said GNSS receiver comprises one GNSS receiving unit installed at a measuring position and for receiving at least three signals from satellites, and an arithmetic processing device configured so as to obtain at least three receiving signals outputted from said GNSS receiving unit at a predetermined time interval, to obtain the at least three receiving signals from said GNSS receiving unit at two sequential times at the predetermined time interval, to obtain a deviation of said measuring position from the at least three received signals at the two sequential times, to integrate said deviation and to obtain a vibration of said measuring position.

18. A safety diagnosis system for structure according to claim 17, wherein said time interval is selected within a range from 10 ms to ½ of the time interval at which a signal issued from the satellite is updated and further set to ¹/₁₀ or less of an estimated vibration cycle of a body to be measured.

19. A safety diagnosis system for structure according to claim 17, wherein said displacement of said absolute coordinate is an addition of a total sum of said deviations and an initial value of said absolute coordinate measured by said GNSS receiver.

20. A safety diagnosis system for structure according to claim 1, wherein, after the diagnosis of said structure is performed by said judging unit, and further, after a predetermined time has elapsed, said GNSS receiver measures an absolute coordinate of an installation position of said GNSS receiver, said control device calculates a displacement of said installation position over time from an absolute coordinate as measured in a previous diagnosis and said absolute coordinate of said installation position after the predetermined time has elapsed, and said judging unit diagnoses safety of said structure based on said displacement over time.

21. A safety diagnosis system for structure according to claim 20, wherein said GNSS receiver comprises one GNSS receiving unit installed at a measuring position and for receiving at least three signals from satellites, and an arithmetic processing device configured so as to obtain at least three receiving signals outputted from said GNSS receiving unit at a predetermined time interval, to obtain the at least three receiving signals from said GNSS receiving unit at two sequential times at the predetermined time interval, to obtain a deviation of said measuring position from the at least three received signals at the two sequential times, to integrate said deviation and to obtain a vibration of said measuring position.

22. A safety diagnosis system for structure according to claim 1, wherein, at least one additional GNSS receiver is further installed at a predetermined position of said structure, and said control device calculates a deformation condition of said structure based on measurement results of each of said GNSS receivers.

23. A safety diagnosis system for structure according to claim 22, wherein said GNSS receiver comprises one GNSS receiving unit installed at a measuring position and for receiving at least three signals from satellites, and an arithmetic processing device configured so as to obtain at least three receiving signals outputted from said GNSS receiving unit at a predetermined time interval, to obtain the at least three receiving signals from said GNSS receiving unit at two sequential times at the predetermined time interval, to obtain a deviation of said measuring position from the at least three received signals at the two sequential times, to integrate said deviation and to obtain a vibration of said measuring position.

24. A safety diagnosis system for structure according to claim 23, wherein said time interval is selected within a range from 10 ms to ½ of the time interval at which a signal issued from the satellite is updated and further set to ⅒ or less of an estimated vibration cycle of a body to be measured.

25. A safety diagnosis system for structure according to claim 23, wherein said displacement of said absolute coordinate is an addition of a total sum of said deviations and an initial value of said absolute coordinate measured by said GNSS receiver.

26. A safety diagnosis system for structure according to claim 1, wherein said GNSS receiver comprises one GNSS receiving unit installed at a measuring position and for receiving at least three signals from satellites, and an arithmetic processing device configured so as to obtain at least three receiving signals outputted from said GNSS receiving unit at a predetermined time interval, to obtain the at least three receiving signals from said GNSS receiving unit at two sequential times at the predetermined time interval, to obtain a deviation of said measuring position from the at least three received signals at the two sequential times, to integrate said deviation and to obtain a vibration of said measuring position.

27. A safety diagnosis system for structure according to claim 26, wherein said time interval is selected within a range from 10 ms to ½ of the time interval at which a signal issued from the satellite is updated and further set to ⅒ or less of an estimated vibration cycle of a body to be measured.

28. A safety diagnosis system for structure according to claim 26, wherein said displacement of said absolute coordinate is an addition of a total sum of said deviations and an initial value of said absolute coordinate measured by said GNSS receiver.

* * * * *